Patented May 18, 1943

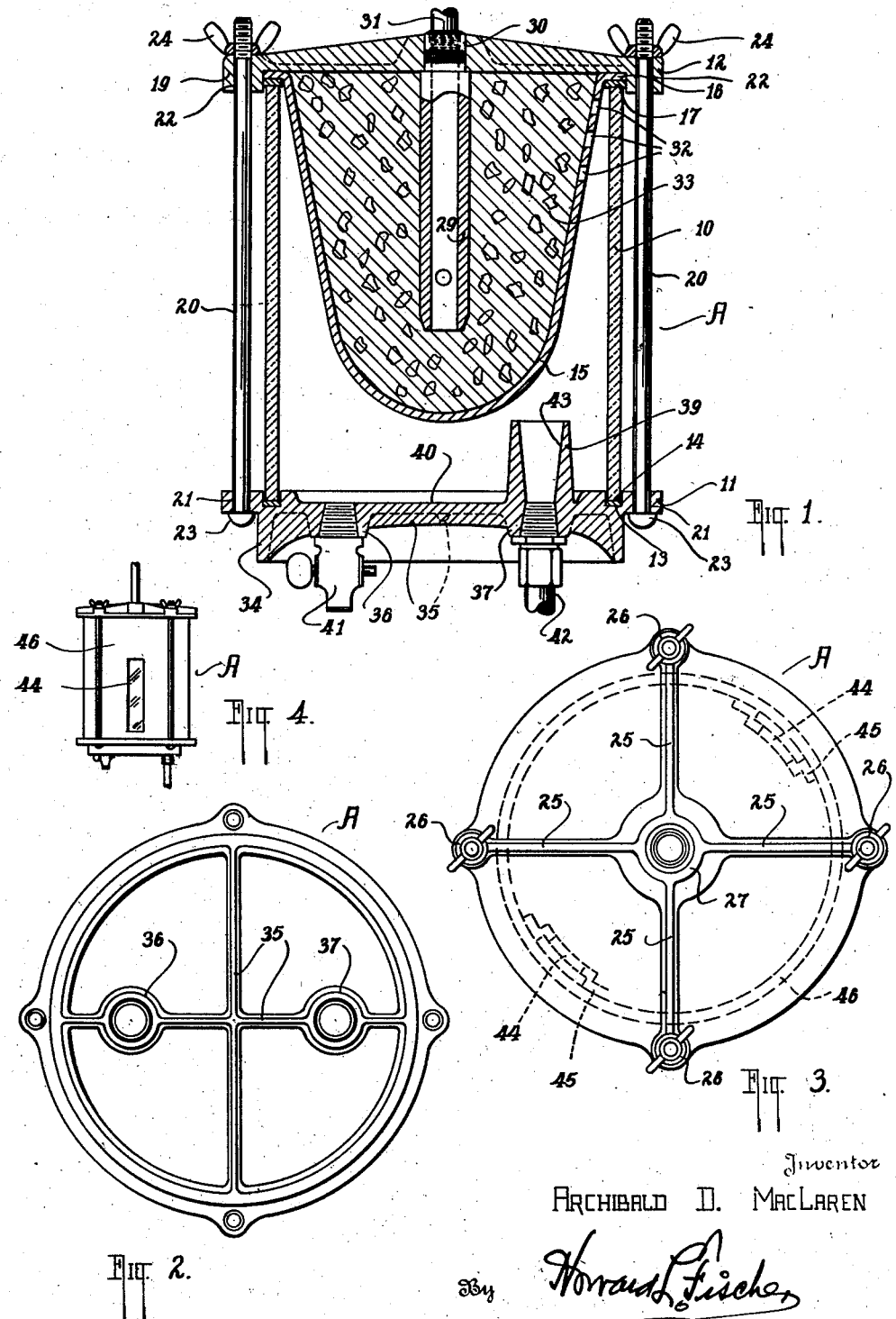

2,319,421

UNITED STATES PATENT OFFICE 2,319,421

OIL FILTER

Archibald D. MacLaren, St. Paul, Minn.

Application October 6, 1939, Serial No. 298,253

3 Claims. (Cl. 210—131)

My invention relates to an improvement in oil filter, wherein it is desired to provide a filtering device capable of removing filterable impurities from oil or the like.

It is well recognized that an oil filter is extremely desirable for use in the oil lines of internal combustion engines and the like to remove filterable impurities from the oil. During the operation of an engine, the movement of the moving parts causes a wearing action between these parts and as a result many minute particles of metal are often found in the oil being used to lubricate these parts. In use the oil also picks up a certain amount of grit and foreign material entering the crank case through the breather pipe and entering the cylinders with the air and fuel. These particles act as an abrasive when suspended in the oil between two moving parts, creating excessive wear between these parts. It has accordingly been common practice to provide a filter which may be inserted in the oil line of a vehicle to remove these foreign particles. While my filter is suitable for other purposes, the use of the same on internal combustion engines is principally intended.

It is an object of my invention to provide a filter in which the oil being filtered must pass upwardly through the filtering material in order to rid the oil of the foreign particles. It is extremely desirable, however, that in forcing the oil upwardly, little oil pressure be consumed in order to prevent the filter from creating high back pressure against the oil pump. Accordingly, I provide a filter having a vertical inlet extending from the top of the filter container to a point near the base of a solid conical member filled with filtering material. Outlets are provided from this conical member near the top of the same to permit oil to readily flow into an oil receiving outer receptacle without resistance. It will then be found that when the oil within the cone has reached the level of the openings in the cone, virtually no pressure will be required to force the liquid through the filtering means, as the upper portion of the liquid will flow through the discharge passage as oil enters through the intake passage near the bottom of the filtering chamber.

It is a purpose of my invention to provide an oil filter having a pair of chambers one within the other, and to provide an inlet extending to a point near the bottom of the inner container, to provide a body of filtering material within the inner container, to provide a passage between the inner and outer containers near the top of the inner container, and to provide an outlet for the outer container at a point spaced from the bottom of the outer container. Thus after the oil has passed through the filtering medium and has drained into the outer container, the oil may be allowed to settle to some extent to remove any impurities not removed by the filtering medium. Furthermore, as oil is lighter than foreign materials such as water and many acids, for example, an opportunity is provided for this oil and these acids to settle out of the oil to remain in the bottom of the outer container.

It is an important feature of my invention to provide an inner container of a substantially conical or cup shape with sides flaring upwardly and outwardly from the bottom thereof to more readily guide oil being filtered to the outlet of the inner container. Oil will travel more readily through a filtering medium and over walls which have been moistened with the oil, than it will pass over dry surfaces. I have found that by forming the inner receptacle with outwardly and upwardly flaring walls, any vibratory movement of the filter will cause a sufficient surge in the liquid within the filtering chamber to wet the filtering material in advance of the actual level of the material so that less pressure is required to raise the level of the liquid within the filtering chamber. I have also found that the inclined walls distribute the oil more thoroughly throughout the entire filter, thus improving the results obtained.

A further feature of my invention resides in the provision of a sight window or pair of sight windows in the outer container through which the condition of the oil may be observed. In one form of my invention the outer container is formed of a cylindrical wall of transparent material. To prevent breakage and to decrease the cost of construction, it is possible to provide a pair of opposite sight windows through an opaque outer casing, one window of which will admit light into the outer casing, while the other is viewed.

These and other objects and novel features of my invention will be more clearly and fully set forth in the following specification and claims.

In the drawing forming a part of my invention:

Figure 1 is a vertical cross-sectional view through my oil filter showing the relationship of the various parts.

Figure 2 is a bottom plan of my oil filter with the connecting pipes and drain cock removed therefrom.

Figure 3 is a top plan view of my filter disclosing sight windows on opposite sides thereof.

Figure 4 is a side elevation view disclosing one of the sight windows illustrated in Figure 3.

My filter A includes a cylindrical outer casing 10 confined between a base 11 and a top cap 12. The base 11 is provided with a suitable annular groove 13 therein to contain the lower extremity of the shell 10. A gasket 14 is interposed between the cylindrical wall 10 and the base of the groove 13 to prevent leakage of oil therebetween.

A filtering chamber in the form of a conical or cup-shaped enclosure 15 is provided with a peripheral flange 16 extending about the upper periphery thereof in contact with the cap or top 12. A gasket 17 is interposed between the upper extremity of the cylindrical wall 10 and the flange 16 to prevent the leakage of oil therebetween. A downwardly extending circular flange 19 encircles the outer edge of the flange 16 and the gasket 17 to hold these various elements in proper relationship.

Angularly spaced bolts 20 extend through aligned openings 21 and 22 in the base 11 and cap 12 respectively, the heads 23 of the bolts engaging the lower surface of the base 11. These bolts are provided with tightening means such as the wing nuts 24. By tightening the wing nuts 24, the gaskets 14 and 17 are compressed, sealing the base 11 and top 12 with respect to the cylindrical wall 10. Transverse reinforcing ribs 25 may be provided to extend between upwardly projecting bosses 26, reinforcing the top 12 adjacent the hole 22 and a central boss 27. A central downwardly projecting tube 29 is provided with an upper portion 30 of reduced diameter which may be pressed or otherwise secured in a central opening through the boss 27. An inlet tube 31 is threaded or otherwise affixed in the upper extremity 30 of the tube 29 to introduce oil through this tube to a point near the base of the filtering chamber 15.

Openings 32 are provided through the wall of the enclosure 15 near the upper extremity thereof. These openings 32 serve as outlets for the liquid within the flared or conical enclosure 15. A body of filtering material 33 is positioned within this cup or filtering compartment in order to filter the oil passing therethrough. The base 11 is provided with a downwardly projecting reinforcing ring 34 which is transversely connected by crossed reinforcing ribs 35. Bosses 36 and 37 project downwardly from the base 11, and a sleeve 39 in alignment with the boss 37 projects upwardly from the upper surface of the base 11. The center portion of the base 11 is recessed slightly as at 40, and a drain cock 41 is threadably or otherwise secured in the boss 36 to permit drainage of the lower portion of the outer compartment defined by the cylinder 10. An outlet pipe 42 is suitably secured in the boss 37 to receive oil passing through the discharge opening 43, through the aligned sleeve 39 and boss 37.

In Figure 1 of the drawing, I have disclosed the outer cylindrical wall 10 as being formed of glass or a suitable transparent plastic or other material. If it is desired, however, this outer cylindrical wall may be made of some opaque material such as metal or the like, and opposed sight windows 44 may be mounted in suitable frames 45 in such a manner that the oil may be viewed. One of the sight windows 44 is positioned in such a manner that light may be admitted into the outer receptacle while the other sight window will provide an opportunity for a person to view the oil within the filter. The cylindrical wall 46 is similar to the cylindrical wall 10 in other respects.

In operation, the oil is forced under pressure downwardly from the pipe 31 through the tube 29 and into the bottom portion of the inner receptacle 15. This enclosure or receptacle 15 is provided with upwardly and outwardly flaring walls so that tilting of the filter will permit the oil to be guided up the walls and wet the filtering material above the actual liquid level. The shape of the inner receptacle permits the oil to be forced upwardly on all sides of the central inlet pipe and the filtered oil may flow out through the discharge openings 32. After sufficient oil has flowed from the discharge passages 32 into the outer compartment, to raise the liquid level in this outer compartment to the top of the sleeve 39, oil is permitted to discharge out through the discharge pipe 42. The condition of the oil may at any time be noted by looking through the opposed sight openings 44 or by looking through the transparent casing 10.

In accordance with the patent statutes, I have described the principles of construction and operation of my oil cleaner; and while I have endeavored to set forth the best embodiments thereof, I desire to have it understood that this is only illustrative of a means of carrying out my invention, and that obvious changes may be made within the scope of the following claims without departing from the spirit of my invention.

I claim:

1. An oil filter comprising a top closure plate, a substantially parallel bottom closure plate, an upright substantially cylindrical shell between said plates, clamping bolts connecting said plates externally of said shell, a cup-shaped receptacle having a rounded bottom end and outwardly tapering side walls, said receptacle having a peripheral rim thereupon overlying the upper edge of said shell, a gasket between said shell and said rim to seal the joint therebetween, said rim being clamped between said shell and said top closure plate by said clamping bolts, filtering material in said receptacle, said receptacle having an outlet passage therethrough adjacent said rim, an inlet pipe extending downwardly from said top closure plate into spaced relation to the bottom of said receptacle, said bottom closure plate having an outlet opening therethrough.

2. An oil filter comprising a top closure plate, a substantially parallel bottom closure plate, an upright substantially cylindrical shell between said plates, clamping bolts connecting said plates externally of said shell, a cup-shaped receptacle having a rounded bottom end and outwardly tapering side walls, said receptacle having a peripheral rim thereupon overlying the upper edge of said shell, a gasket between said shell and said rim to seal the joint therebetween, said rim being clamped between said shell and said top closure plate by said clamping bolts, filtering material in said receptacle, an inlet pipe extending downwardly from said top closure plate into spaced relation to the bottom of said receptacle, said receptacle having an outlet passage therethrough adjacent said rim, a sleeve on said bottom closure plate extending upwardly therefrom, the portion of said shell encircling said sleeve forming a well for oil, said sleeve being offset from the rounded bottom end of said receptacle so that liquid draining down the sides of said receptacle will not drop directly into said sleeve, said sleeve forming an oil outlet.

3. An oil filter comprising inner and outer containers one within the other formed of light impervious material, an oil inlet to said inner container, said inner chamber having a discharge passage into said outer container, filtering material in said inner container, a sleeve on said outer container extending upwardly from the lower end thereof through which oil may flow from said outer container, the portion of said outer container encircling said sleeve forming a well for oil, said sleeve being offset from the axis of said outer container, and opposed sight windows in said outer container extending below the level of the upper extremity of said sleeve so as to extend below the level of oil filling said well, the offsetting of said sleeve providing a line of vision between said sight windows through the oil filling said well.

ARCHIBALD D. MacLAREN.